United States Patent
Murayama et al.

(10) Patent No.: US 6,638,421 B2
(45) Date of Patent: Oct. 28, 2003

(54) WATER TREATMENT CONTROL SYSTEM USING FLUORESCENCE ANALYZER

(75) Inventors: Seiichi Murayama, Kawasaki (JP); Futoshi Kurokawa, Fuchu (JP); Masao Kaneko, Saitama (JP); Kotaro Iyasu, Fuchu (JP); Kenji Taguchi, Kawasaki (JP); Kie Kubo, Chigasaki (JP); Shojiro Tamaki, Nishitokyo (JP); Akira Hiramoto, Fuchu (JP); Takumi Hayashi, Kunitachi (JP); Nobuyoshi Kaiga, Tokyo-To (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 09/995,764

(22) Filed: Nov. 29, 2001

(65) Prior Publication Data
US 2002/0104787 A1 Aug. 8, 2002

(30) Foreign Application Priority Data
Nov. 30, 2000 (JP) ........................ 2000-365858

(51) Int. Cl.$^7$ .............................................. B01D 17/12
(52) U.S. Cl. ..................... 210/96.1; 210/97; 210/198.1; 210/206; 210/908; 73/61.43
(58) Field of Search .................. 210/88, 85, 96.1, 210/96.2, 97, 101, 105, 198.1, 205, 206, 753–756, 739, 908, 502.1, 503; 73/61.43, 61.48

(56) References Cited

U.S. PATENT DOCUMENTS 4,549,966 A * 10/1985 Beall ......................... 210/661

FOREIGN PATENT DOCUMENTS

| JP | 4-225896 | | 8/1992 | |
| JP | 100473776 A | * | 2/1998 | ............. C02F/1/78 |
| JP | 3038926 | | 3/2000 | |

* cited by examiner

Primary Examiner—Terry K. Cecil
(74) Attorney, Agent, or Firm—Finnegan, Henderson, Farabow, Garrett & Dunner, L.L.P.

(57) ABSTRACT

A water treatment control system using a fluorescence analyzer includes an activated carbon injection equipment 4 having an activated carbon injector 4a, a fluorescence analyzer 7 provided on the upstream of the activated carbon injector 4a, and a flowing water flowmeter 6. An activated carbon injection rate necessary to reduce a trihalomethane formation potential is calculated by an activated carbon injection rate calculating apparatus 8 based on a measured value from the fluorescence analyzer 7. An activated carbon injection amount from the activated carbon injector 4a is controlled by an activated carbon injection amount control apparatus 9 based on the activated carbon injection rate and a measured value from the flowing water flowmeter 6.

2 Claims, 6 Drawing Sheets

WATER TREATMENT CONTROL SYSTEM USING FLUORESCENCE ANALYZER

FIELD OF THE INVENTION

The present invention relates to a water treatment control system using a fluorescence analyzer, including a fluorescence analyzer, a chlorine agent injection equipment, an activated carbon injection equipment, an ozone treatment equipment, a coagulation-sedimentation equipment or a membrane filtration apparatus.

BACKGROUND ART

In a water treatment facility such as a purification plant, a precipitation treatment is carried out by introducing a ground water or surface water as a raw water to a receiving well, and adding a coagulant in a coagulation-sedimentation equipment to form flocs. Then, a settled water is passed through a sand filtration apparatus to remove suspended matters, and finally, conducted a chlorine treatment for disinfect to supply customers. In order to ensure an effect of the chlorine treatment for disinfect more reliably, a intermediate chlorination is performed in which a chlorine is injected to a sedimentation water at a prechlorination for injecting a chlorine prior to a coagulant injection point. The prechlorination is effective in removing an ammonia nitrogen and microorganisms, or oxidized-removing an iron and manganese in the raw water. With respect to a raw water having a high trihalomethane formation potential, it is preferable to adopt a intermediate chlorination for a reduction of trihalomethane.

A change-over of the individual chlorine treatments is not automatically controlled, but is operated by an operator based on his or her feeling and experience, watching the raw water quality.

When the raw water cannot be treated with the usual treatment because of a deterioration of the raw water quality, a powdered activated carbon is thrown into the receiving well or the like so that dissolved matters are absorbed in the activated carbon. The dissolved matters are removed at a subsequent coagulation-sedimentation treatment. The thrown amount of the activated carbon is neither automatically controlled, but is operated by an operator based on his or her feeling and experience, watching the raw water quality to decide the thrown amount.

In a water treatment field, specifically a water purification treatment, a chlorine treatment is prevalently used for a disinfect treatment and a removal of iron and manganese, as stated above. In the case where a trihalomethane precursor is mixed in a raw water, a trihalomethane is generated by a chlorine treatment. Since the trihalomethane is a carcinogenic substance, the generation of trihalomethane must be constrained in a water treatment process.

Currently, it is impossible to monitor in an online mode measurement of trihalomethane and trihalomethane precursor, as it takes long time and costs money. An ozone treatment and an activated carbon treatment are effective ones for removing the trihalomethane precursor. However, there are few treatment plants having an ozone treatment.

SUMMARY OF THE INVENTION

The present invention is made in view of the above disadvantages and has an object to provide a water treatment control system using a fluorescence analyzer which is capable of reducing a trihalomethane formation potential, by measuring in an online mode a relative fluorescence intensity of a raw water or a water to be treated by a fluorescence analyzer, and controlling, based on a measured value from the fluorescence analyzer, treatment processes of an activated carbon injection treatment, a chlorine agent injection treatment, an ozone injection treatment, a coagulant injection treatment, or a membrane treatment.

A water treatment control system using a fluorescence analyzer of the present invention comprises an injection mechanism for injecting an impregnating agent to a water to be treated, a fluorescence analyzer for measuring a relative fluorescence intensity of the water to be treated, a flowing water flowmeter for measuring a flow rate of the water to be treated, and a control apparatus for calculating an impregnating agent injection rate necessary to reduce a trihalomethane formation potential based on a measured value from the fluorescence analyzer to control the injection mechanism based on the impregnating agent injection rate and the flow rate from the flowing water flowmeter.

The water treatment control system using a fluorescence analyzer of the present invention, wherein the injection mechanism includes an activated carbon injector for injecting an activated carbon to the water to be treated, and wherein the control apparatus includes an activated carbon injection rate calculating apparatus for calculating an activated carbon injection rate necessary to reduce the trihalomethane formation potential based on the measured value from the fluorescence analyzer, and an activated carbon injection amount control apparatus for controlling an activated carbon injection amount from the activated carbon injector based on the flow rate from the flowing water flowmeter and the activated carbon injection rate calculated by the activated carbon injection rate calculating apparatus.

The water treatment control system using a fluorescence analyzer according to the present invention, wherein the fluorescence analyzer consists of a pair of analyzers provided on both upstream side and downstream side of the activated carbon injector, and the activated carbon injection rate calculating apparatus calculates the activated carbon injection rate based on measured values from the pair of analyzers.

The water treatment control system using a fluorescence analyzer according to the present invention, wherein the injection mechanism includes a plurality of chlorine agent injectors for injecting a chlorine agent to the water to be treated, and wherein the control apparatus includes a chlorine agent injection equipment calculation apparatus for selecting an optimum chlorine agent injector to constrain the trihalomethane formation potential based on the measured value of the fluorescence analyzer, and for calculating a chlorine agent injection rate, and a chlorine agent injection amount control apparatus for controlling a chlorine agent injection amount from the chlorine agent injector based on the flow rate from the flowing water flowmeter and the chlorine agent injection rate calculated by the chlorine agent injection equipment calculation apparatus.

The water treatment control system using a fluorescence analyzer according to the present invention, wherein the fluorescence analyzer is provided on the upstream side of the chlorine agent injectors.

The water treatment control system using a fluorescence analyzer according to the present invention, wherein the injection mechanism includes an ozone treatment equipment having a plurality of ozone tanks arranged serially, each of which has an ozone injector for injecting an ozone to the water to be treated, and wherein the control apparatus includes an ozone injection rate calculating apparatus for calculating an ozone injection rate to the respective ozone tanks necessary to reduce the trihalomethane formation potential based on a measured value of a control fluorescence analyzer, and an ozone injection amount control apparatus for controlling an ozone injection amount from the ozone injectors based on the flow rate from the flowing water flowmeter and the ozone injection rate calculated by the ozone injection rate calculating apparatus.

The water treatment control system using a fluorescence analyzer according to the present invention, wherein the fluorescence analyzer is provided in at least one of the ozone tanks.

The water treatment control system using a fluorescence analyzer according to the present invention, wherein the injection mechanism includes a coagulant injector for injecting a coagulant to the water to be treated, and wherein the control apparatus includes a coagulant injection rate calculating apparatus for calculating an optimum coagulant injection rate necessary to reduce the trihalomethane formation potential based on the measured value of the fluorescence analyzer, and a coagulant injection amount control apparatus for controlling a coagulant injection amount from the coagulant injector based on the flow rate from the flowing water flowmeter and the coagulant injection rate calculated by the coagulant injection rate calculating apparatus.

The water treatment control system using a fluorescence analyzer according to the present invention, wherein the fluorescence analyzer consists of a pair of analyzers provided on both upstream side and downstream side of the coagulant injector, and the coagulant injection rate calculating apparatus calculates the coagulant injection rate based on measured values from the pair of analyzers.

The water treatment control system using a fluorescence analyzer comprises a membrane filtration apparatus for separating and removing a turbid substance in a water to be treated, a fluorescence analyzer for measuring a relative fluorescence intensity of the water to be treated, and a membrane filtration operation control apparatus for operating and controlling the membrane filtration apparatus based on the measured value of the fluorescence analyzer.

The water treatment control system using a fluorescence analyzer according to the present invention, wherein the fluorescence analyzer consists of a pair of analyzers provided on both upstream side and downstream side of the membrane filtration apparatus, and the membrane filtration operation control apparatus operates and controls the membrane filtration apparatus based on the measured values from the pair of analyzers.

According to the present invention, the activated carbon injection rate necessary to reduce the trihalomethane formation potential is calculated by the activated carbon injection rate calculating apparatus, based on either of the relative fluorescence intensity on the upstream side or the downstream side of the activated carbon injector, so as to control the activated carbon injection amount by the activated carbon injection amount control apparatus, based on the activated carbon injection rate calculated by the activated carbon injection rate calculating apparatus. As a result, the trihalomethane formation potential can be surely reduced with a minimum necessary activated carbon injection amount to be used.

According to the present invention, an optimum chlorine agent injection point where the chlorine agent exerts its treatment effect and constrains the trihalomethane formation potential is selected, and the chlorine agent injection rate is calculated by the chlorine agent injection equipment calculating apparatus, based on a relative fluorescence intensity on the upstream side of the chlorine agent injector, so as to control the chlorine agent injection amount by the chlorine agent injection amount control apparatus, based on the chlorine agent injection rate calculated by the chlorine agent injection equipment calculating apparatus. As a result, the trihalomethane formation potential can be surely reduced with a minimum necessary chlorine agent to be used.

According to the present invention, an ozone injection rate to the respective ozone tanks necessary to reduce the trihalomethane formation potential is calculated by the ozone injection rate calculating apparatus, based on a relative fluorescence intensity in one of the plurality of ozone tanks or of all flowing rate, so as to control an ozone supply amount to the respective ozone tanks. As a result, the trihalomethane formation potential can be surely reduced with a minimum necessary ozone to be supplied.

According to the present invention, a coagulant injection rate necessary to reduce the trihalomethane formation potential is calculated by the coagulant injection rate calculating apparatus, based on either of the relative fluorescence intensity on the upstream side or the downstream side of the coagulant injector, so as to control a coagulant injection amount by the coagulant injection amount control apparatus, based on the coagulant injection rate calculated by the coagulant injection rate calculating apparatus. As a result, the trihalomethane formation potential can be surely reduced with a minimum necessary coagulant injection amount to be used.

According to the present invention, a film can be prevented from fouling and a term for a chemical cleaning can be extended, by operating and controlling the membrane filtration apparatus based on a relative fluorescence intensity of either upstream side or downstream side of the membrane filtration apparatus.

PREFERRED EMBODIMENTS OF THE INVENTION

First Embodiment

Figure 1:
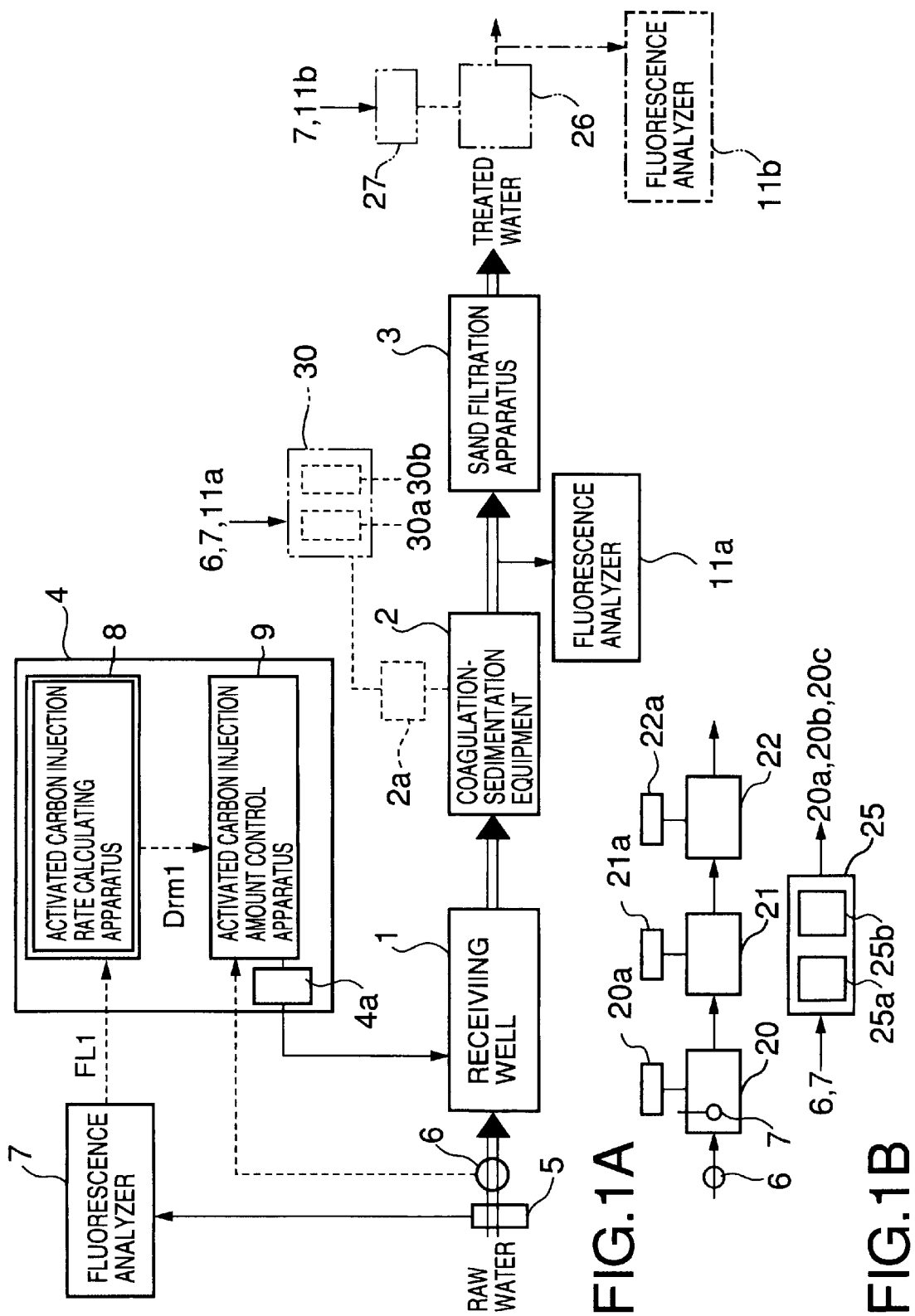
FIGS. 1A and 1B are structural charts showing a first embodiment of a water treatment control system using a fluorescence analyzer according to the present invention.
Figure 2:
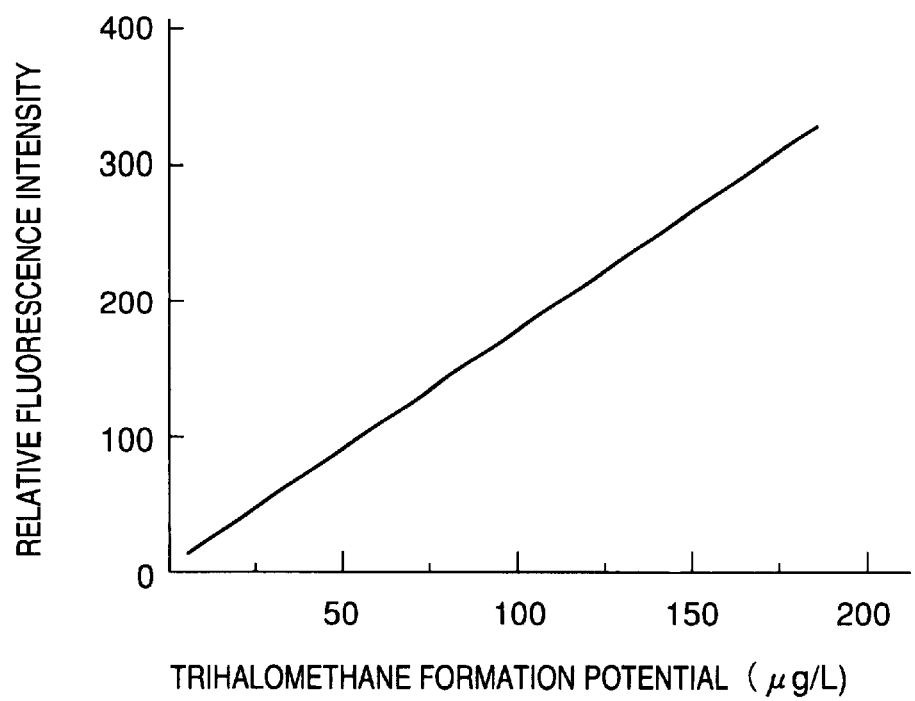
FIG. 2 is a graph showing an example of a relationship of a relative fluorescence intensity and a trihalomethane formation potential.
Figure 3:
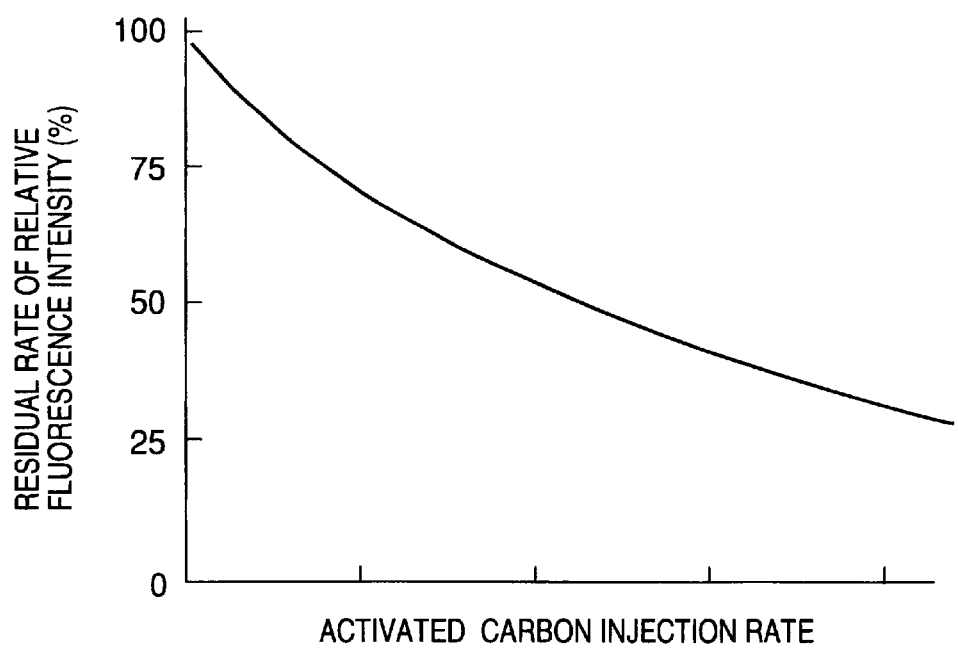
FIG. 3 is a graph showing an example of a relationship of an activated carbon injection rate and a residual rate of a relative fluorescence intensity (FLr)

Embodiments of the present invention will be hereinafter described with reference to the drawings. FIGS. 1 to 3 show a first embodiment of a water treatment control system using a florescence analyzer according to the present invention.

In the first embodiment, in a purification plant (water treatment facility) having an activated carbon injection equipment, a desired activated carbon injection amount is calculated based on a relative fluorescence intensity of a water to be treated, to achieve a minimum necessary activated carbon injection for a reduction of trihalomethane formation potential.

As shown in FIG. 1A, the water treatment control system according to the present invention includes a receiving well 1 for receiving a raw water (water to be treated) and a coagulation-sedimentation equipment 2 for adding a coagulant on the downstream side of the receiving well 1. The coagulation-sedimentation equipment 2 removes dissolved polymer organic matters. A sand filtration apparatus 3 for removing suspended matters suspending in the water is provided on the downstream of the coagulation-sedimentation equipment 2.

In preparation for the case where trihalomethane precursor can not be reduced by the usual treatment because of a deterioration of the raw water quality, an activated carbon injection equipment 4 for injecting an activated carbon from an activated carbon injector 4a is provided at the receiving well 1.

As shown in FIG. 1A, a raw water intake port 5 and a flowmeter (flowing water flowmeter) 6 are disposed on the upstream of the receiving well 1. The flowmeter 6 measures a flow rate $Q[m^3/h]$ of the raw water. A fluorescence analyzer 7 for measuring a relative fluorescence intensity of the raw water is connected to the raw water intake port 5. An activated carbon injection rate calculating apparatus 8 is connected to the fluorescence analyzer 7 for calculating a minimum necessary activated carbon injection rate for a reduction of trihalomethane formation potential, based on a measured value of the fluorescence analyzer 7. An activated carbon injection amount control apparatus 9 is connected to the activated carbon injection rate calculating apparatus 8.

The fluorescence analyzer 7 of this embodiment calculates a fluorescence spectrum with an excitation wavelength of 345 nm, and calculates an excitation spectrum with a fluorescence wavelength of 425 nm. Thus, a relative fluorescence intensity with a fluorescence spectrum of 425 nm is calculated.

In FIG. 1A, the activated carbon injection equipment 4 is composed of the activated carbon injector (injection mechanism for injecting an impregnating agent) 4a and control apparatuses 8, 9 including the activated carbon injection rate calculating apparatus 8 and the activated carbon injection amount control apparatus 9.

An operation of this embodiment as is structured above will be described. The raw water (water to be treated) flows to be treated sequentially from the receiving well 1, the coagulation-sedimentation equipment 2 and the sand filtration apparatus 3. During this process, the raw water is extracted at the raw water intake port 5, and then is sent to the fluorescence analyzer 7.

A relative fluorescence intensity of the raw water is always measured by the fluorescence analyzer 7, and is always output to the activated carbon injection rate calculating apparatus 8 as a measured value FL1. A relationship of the relative fluorescence intensity and the trihalomethane formation potential, a relationship of the activated carbon injection rate and the residual rate of the relative fluorescence intensity (FLr), and a control desired value (FLco) of the trihalomethane formation potential based on the above relationships are included in the activated carbon injection rate calculating apparatus 8. The activated carbon injection rate calculating apparatus 8 calculates an activated carbon injection rate (Drm1) required for the FL1 to be lower than the Flco to output to the activated carbon injection amount control apparatus 9.

FIG. 2 is a graph showing an example of a relationship of the relative fluorescence intensity and the trihalomethane formation potential. FIG. 3 is a graph showing an example of a relationship of the activated carbon injection rate and the residual rate of a relative fluorescence intensity (FLr).

The activated carbon injection amount control apparatus 9 calculates an activated carbon injection amount desired value Ps based on the inputs of a measured value of the flowmeter 6 and the activated carbon injection rate (Drm1) from the activated carbon injection rate calculating apparatus 8, and performs an FF (feed forward) control of the activated carbon injector 4a based on the Ps for injecting an activated carbon.

According to the above method, the desired activated carbon injection rate is calculated by the activated carbon injection rate calculating apparatus 8 based on the relative fluorescence intensity of the raw water, and FF controlling of the activated carbon injection amount is performed. As a result, the activated carbon injection amount used for reducing trihalomethane formation potential can be made minimum.

In FIG. 1A, it may be possible that the coagulation-sedimentation equipment 2 is provided with a coagulant injector (injection mechanism for an impregnating agent) 2a, and a coagulant injection rate calculating apparatus 30a is connected to the coagulant injector 2a for calculating an optimum coagulant injection rate for reducing the trihalomethane formation potential, based on the measured values from the fluorescence analyzer 7 on the upstream side of the coagulant injector 2a and a fluorescence analyzer 11a on the downstream side of the coagulant injector 2a. A signal from the coagulant injection rate calculating apparatus 30a is sent to a coagulant injection amount control apparatus 30b. The coagulant injection amount control apparatus 30b controls the coagulant injector 2a based on the flow rate from the flowing water flowmeter 6 and the coagulant injection rate from the coagulant injection rate calculating apparatus. In this case, a coagulant control apparatus 30 is composed of the coagulant injection rate calculating apparatus 30a and the coagulant injection amount control apparatus 30b.

A membrane filtration apparatus 26 for separating and removing turbid substances in the water to be treated may be provided on the downstream side of the sand filtration apparatus 3. A membrane filtration operation control apparatus 27 may be connected to the membrane filtration apparatus 26 for operating and controlling the membrane filtration apparatus 26 based on the measured values from the fluorescence analyzer 7 and a fluorescence analyzer 11b on the downstream side of the membrane filtration apparatus 26.

In this case, the membrane filtration operation control apparatus 27 controls automatically and periodically a physical cleaning time and a cleaning process of the membrane. However, the membrane filtration operation control apparatus 27 may control a membrane filtration time, a membrane filtration water amount and a membrane filtration process, in place of the cleaning time and the cleaning process.

As shown in FIG. 1B, the water treatment control system may include an ozone treatment equipment (injection mechanism for ozone) having a plurality of serial ozone tanks 20, 21, 22, with ozone injectors 20a, 21a, 22a, respectively.

In FIG. 1B, an ozone control apparatus 25 is connected to each ozone injector 20a, 21a, 22a. The ozone control apparatus 25 is composed of an ozone injection rate calculating apparatus 25a for calculating an ozone injection rate for the respective ozone tanks 20, 21, 22 necessary to reduce the trihalomethane formation potential, based on a measured value of the fluorescence analyzer 7 disposed in the ozone tank 20, and an ozone injection amount control apparatus 25b for controlling an ozone injection amount from the ozone injectors 20a, 21a, 22a, based on the ozone injection rate from the ozone injection rate calculating apparatus 25a and the flow rate from the flowing water flowmeter 6.

Second Embodiment

A second embodiment according to the present invention will be described with reference to FIG. 4.

Figure 4:
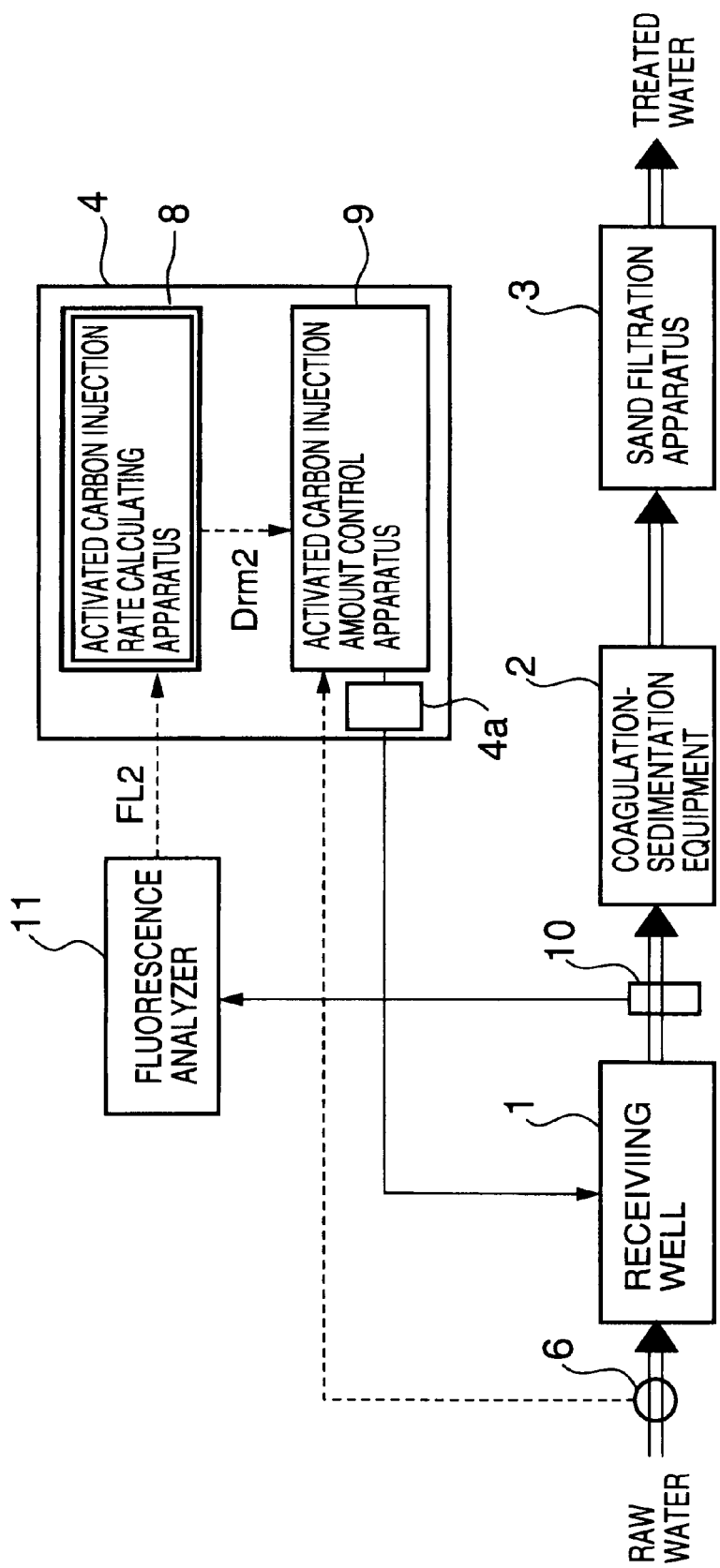
FIG. 4 is a structural chart showing a second embodiment of a water treatment control system using a fluorescence analyzer according to the present invention.

In the second embodiment shown in FIG. 4, instead of the raw water intake port 5, a coagulation-sedimentation raw water intake port 10 is provided on the upstream side of the coagulation-sedimentation equipment 2, and a fluorescence analyzer 11 for measuring a relative fluorescence intensity of the raw water is connected to the raw water intake port 10. The rest is substantially identical with the first embodiment shown in FIGS. 1 to 3. In FIG. 4, the same parts as those of the first embodiment shown in FIGS. 1 to 3 have the same reference numbers, and their detailed description are omitted.

In FIG. 4, the raw water (water to be treated) is extracted at the coagulation-sedimentation raw water intake port 10, and then is sent to the fluorescence analyzer 11. A relative fluorescence intensity of the raw water is always measured by the fluorescence analyzer 11, and is always output to the activated carbon injection rate calculating apparatus 8 as a measured value FL2. A relationship of the relative fluorescence intensity and the trihalomethane formation potential, a relationship of the activated carbon injection rate and the residual rate of the relative fluorescence intensity (FLr), and a control desired value (FLco) of the trihalomethane formation potential based on the above relationships are included in the activated carbon injection rate calculating apparatus 8. The activated carbon injection rate calculating apparatus 8 calculates an activated carbon injection rate (Drm2) required for making the FL2 lower than the Flco and outputs the activated carbon injection rate to the activated carbon injection amount control apparatus 9.

The activated carbon injection amount control apparatus 9 calculates an activated carbon injection amount desired value Ps based on the inputs of a measured value of the flowmeter 6 and the activated carbon injection rate (Drm2) from the activated carbon injection rate calculating apparatus 8, and performs an FB (feed back) control of the activated carbon injector 4a based on the Ps for injecting an activated carbon.

According to the above method, the desired activated carbon injection rate is calculated by the activated carbon injection rate calculating apparatus 8 based on the relative fluorescence intensity of the raw water, and FF controlling of the activated carbon injection amount is performed. As a result, the activated carbon injection amount used for reducing trihalomethane formation potential can be made minimum.

Third Embodiment

A third embodiment will be described with reference to FIG. 5.

Figure 5:
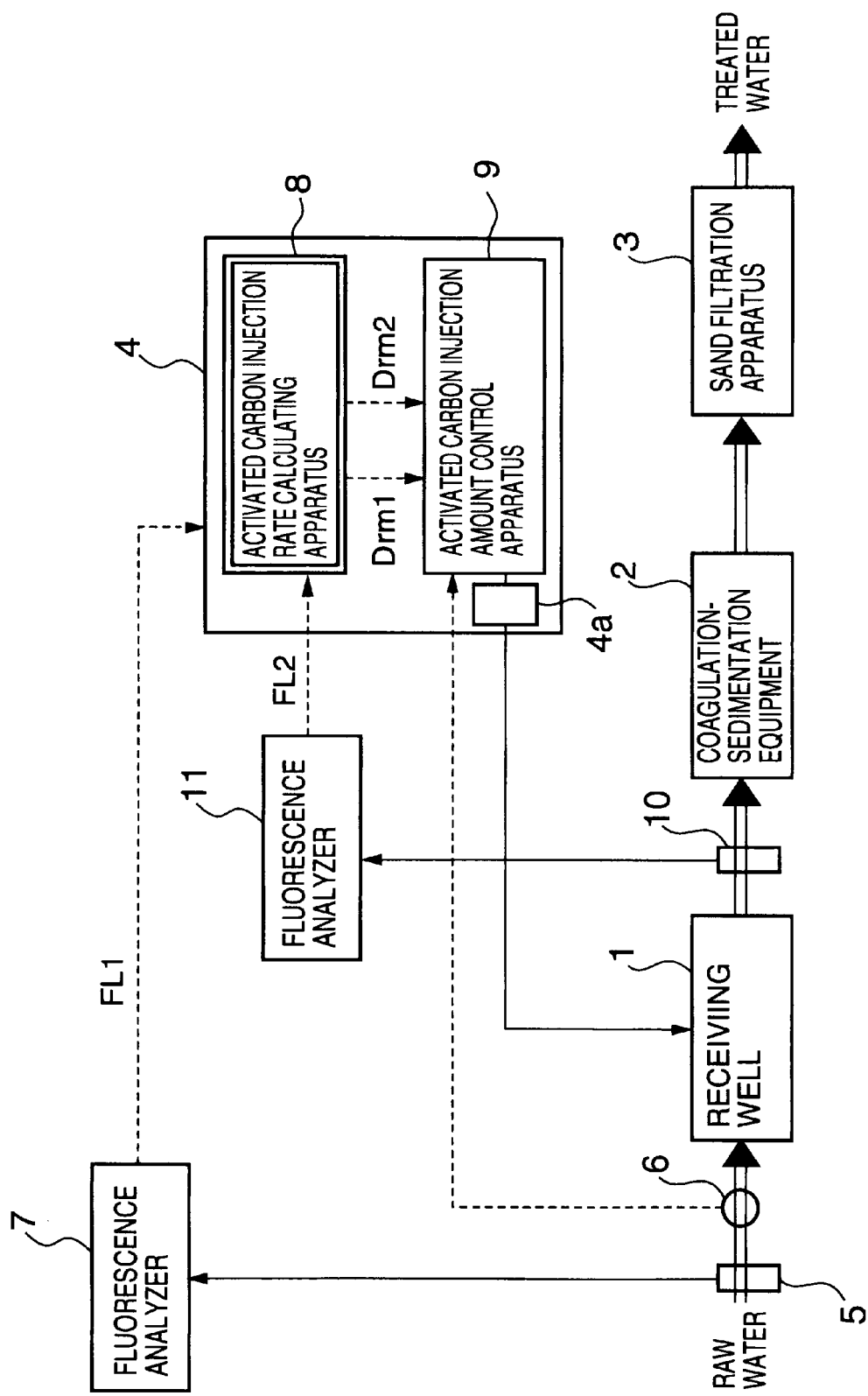
FIG. 5 is a structural chart showing a third embodiment of a water treatment control system using a fluorescence analyzer according to the present invention.

In the third embodiment shown in FIG. 5, both the raw water intake port 5 and the coagulation-sedimentation raw water intake port 10 are provided. The fluorescence analyzers 7, 11 for measuring a relative fluorescence intensity are connected to the raw water intake port 5 and the coagulation-sedimentation raw water intake port 10, respectively. The rest is substantially identical with the first embodiment shown in FIGS. 1 to 3. In FIG. 5, the same parts as those of the first embodiment shown in FIGS. 1 to 3 have the same reference numbers, and their detailed description are omitted.

In FIG. 5, the raw water (water to be treated) is extracted at the raw water intake port 5 and the coagulation-sedimentation raw water intake port 10, and is sent to the fluorescence analyzer 7 and the fluorescence analyzer 11, respectively. A relative fluorescence intensity of the raw water is always measured by the fluorescence analyzer 7, and is always output to the activated carbon injection rate calculating apparatus 8 as a measured value FL1. A relative fluorescence intensity of the raw water to the coagulation-sedimentation equipment 2 is always measured by the fluorescence analyzer 11, and is always output to the activated carbon injection rate calculating apparatus 8 as a measured value FL2.

A relationship of the relative fluorescence intensity and the trihalomethane formation potential, a relationship of the activated carbon injection rate and the residual rate of the relative fluorescence intensity (FLr), and a control desired value (FLco) of the trihalomethane formation potential based on the above relationships are included in the activated carbon injection rate calculating apparatus 8. The activated carbon injection rate calculating apparatus 8 calculates an activated carbon injection rate (Drm1) required for making the FL1 lower than the Flco, calculates an activated carbon injection rate (Drm2) required for making the FL2 lower than the Flco, and outputs the Drm1 and the Drm2 to the activated carbon injection amount control apparatus 9.

The activated carbon injection amount control apparatus 9 calculates an activated carbon injection amount desired value Ps based on the inputs of the measured value of the flowmeter 6 and the Drm1 and Drm2 from the activated carbon injection rate calculating apparatus 8, and performs a combination control of an FF (feed forward) control and an FB (feed back) control of the activated carbon injector 4a based on the Ps for injecting an activated carbon.

In this case, the activated carbon injection amount control apparatus 9 may adopt one of the Drm1 and Drm2 which is safer, namely, higher injection rate, or adopt an average value of both injection rates.

According to the above method, the desired activated carbon injection rate is calculated by the activated carbon injection rate calculating apparatus 8 based on the relative fluorescence intensity of the raw water, and FF controlling of the activated carbon injection amount is performed. As a result, the activated carbon injection amount used for reducing trihalomethane formation potential can be made minimum.

Fourth Embodiment

A forth embodiment of the present invention will be described with reference to FIG. 6. In the fourth embodiment shown in FIG. 6, in a purification plant having a plurality of chlorine agent injectors, an optimum chlorine agent injector is selected based on a relative fluorescence intensity of a flowing water, and a desired chlorine agent injection amount is calculated to achieve a minimum necessary chlorine agent injection for a reduction of trihalomethane formation potential.

Figure 6:
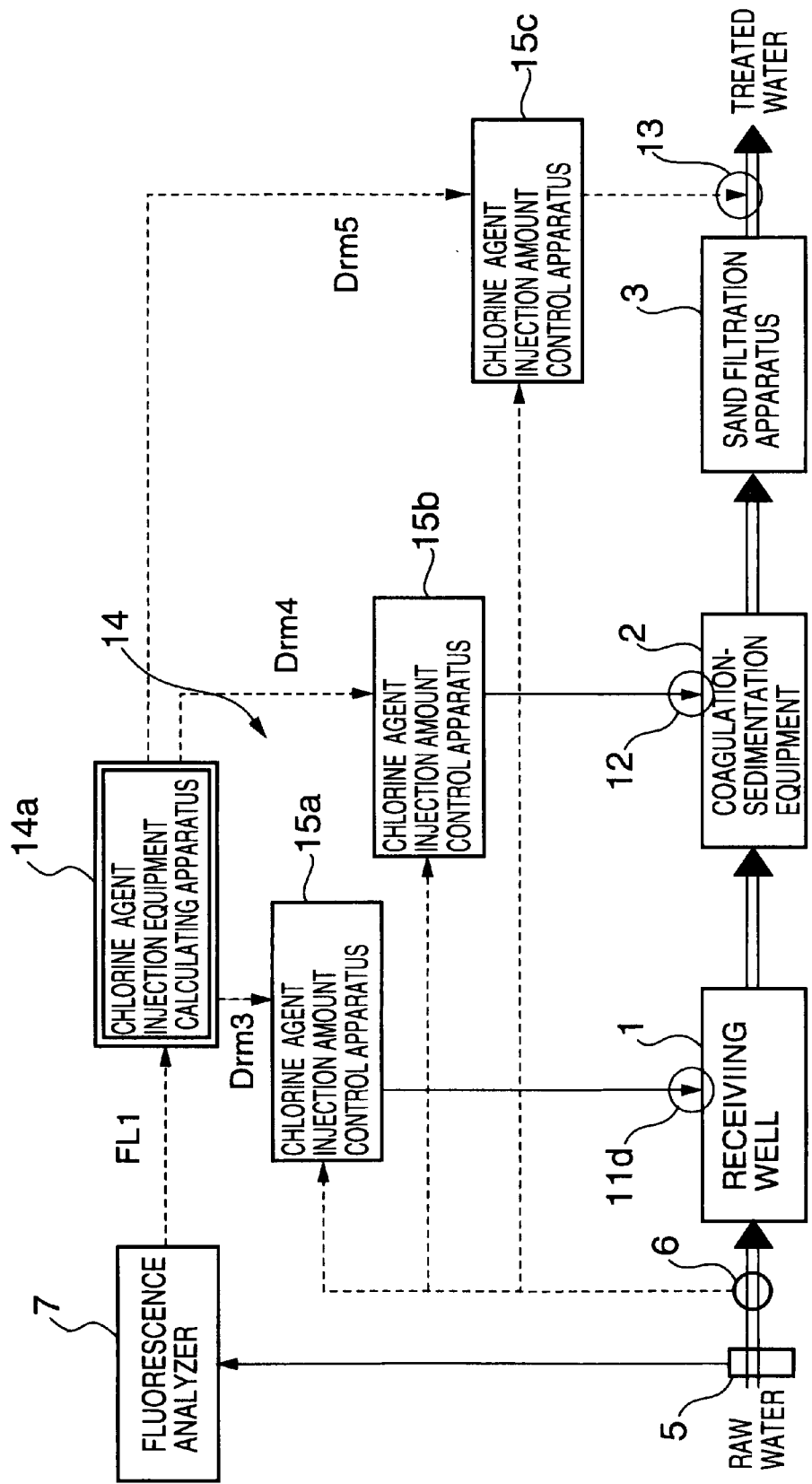
FIG. 6 is a structural chart showing a fourth embodiment of a water treatment control system using a fluorescence analyzer according to the present invention.

As shown in FIG. 6, the water treatment control system includes a receiving well 1, a coagulation-sedimentation equipment 2 and a sand filtration apparatus 3. A raw water intake port 5 and a flowmeter 6 are provided on the upstream side of the receiving well 1. A fluorescence analyzer 7 is connected to the raw water intake port 5.

A chlorine agent injection equipment 14 is provided for removal of ammonia nitrogen, oxidized-removal of an iron and manganese in the raw water (water to be treated), and for a disinfect treatment. The chlorine agent injection equipment 14 includes three types of chlorine agent injectors (injection mechanism for an impregnating agent), such as a prechlorine injector 11d positioned at the receiving well 1, an intermediate chlorine injector 12 positioned at the coagulation-sedimentation equipment 2 and a post-chlorine injector 13 positioned at the outlet of the sand filtration apparatus 3.

A chlorine agent injection equipment calculating apparatus 14a is connected to the fluorescence analyzer 7 for selecting an optimum injection point for the reduction of trihalomethane formation potential, and calculating a minimum necessary chlorine agent injection amount, based on the relative fluorescence intensity of the raw water. Chlorine agent injection amount control apparatuses 15a, 15b, 15c are connected to the chlorine agent injection equipment calculating apparatus 14a, which correspond to the respective chlorine injectors 11d, 12, 13.

In FIG. 6, the chlorine agent injection equipment 14 is composed of the prechlorination injector 11d, the intermediate chlorination injector 12, the postchlorination injector 13 and the control apparatuses 14a, 15a, 15b, 15c including the chlorine agent injection equipment calculating apparatus 14a and the chlorine agent injection amount control apparatuses 15a, 15b, 15c.

An operation of this embodiment as is structured above will be described. The raw water (water to be treated) is extracted at the raw water intake port 5, and is sent to the fluorescence analyzer 7. A relative fluorescence intensity of the raw water is always measured by the fluorescence analyzer 7, and is always output to the chlorine agent injection equipment calculating apparatus 14a as a measured value FL1.

Figure 7:
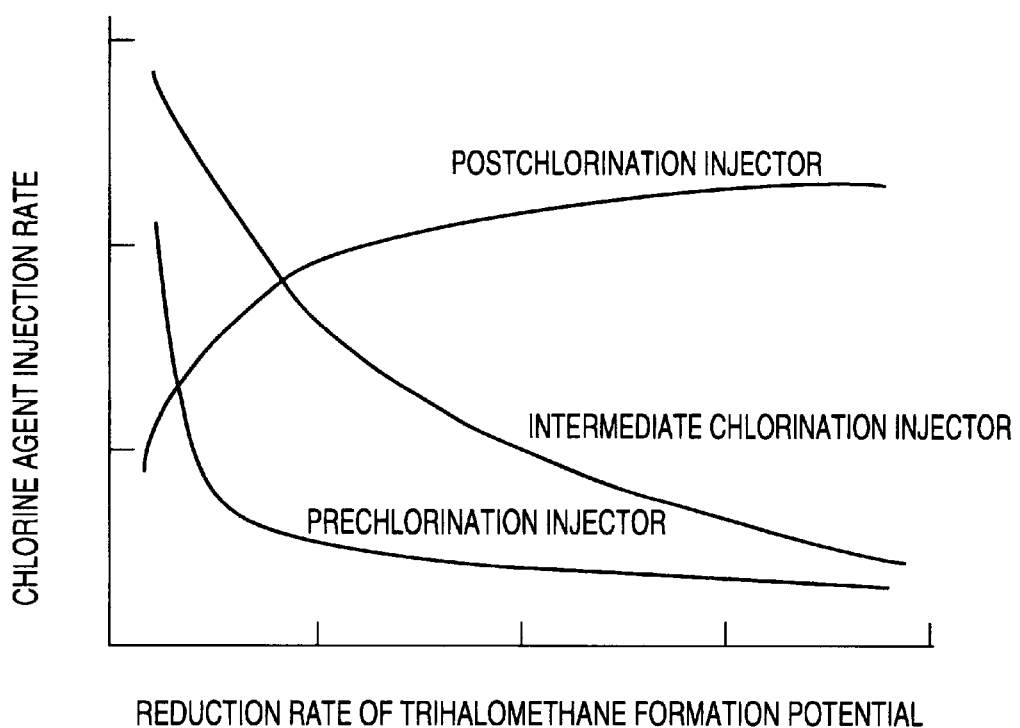
FIG. 7 is a graph showing an example of a relationship of a chlorine agent injection rate and a reduction rate of a trihalomethane formation potential.

A relationship of the relative fluorescence intensity and the trihalomethane formation potential, a relationship of the a desired value of a chlorine agent injection rate and a trihalomethane formation potential (Cth), and a control desired value (Cthsv) of a trihalomethane formation potential based on the relationships are included in the chlorine agent injection equipment calculating apparatus 14a. The chlorine agent injection equipment calculating apparatus 14a selects the optimum chlorine agent injectors 11d, 12, 13 required for making the Cth lower than the Cthsv, and calculates chlorine agent injection rates (Drm3, Drm4, Drm5) to output to the chlorine agent injection control apparatuses 15a, 15b, 15c. FIG. 7 is a graph showing an example of a relationship of a chlorine agent injection rate and a reduction rate of a trihalomethane formation potential.

The chlorine agent injection control apparatuses 15a, 15b, 15c selected by the chlorine agent injection equipment calculating apparatus 14a, which correspond to the chlorine agent injectors 11d, 12, 13 calculate a chlorine agent injection amount desired value Psc1, based on the inputs of the measured value of the flowmeter 6 and the Drm3, Drm4, Drm5 from the chlorine agent injection equipment calculating apparatus 14a, and perform FF (feed forward) controlling of the chlorine agent injectors 11d, 12, 13 based on the Psc1 for injecting a chlorine agent.

According the above method, the of chlorine agent injection point to be used is selected by the chlorine agent injection equipment calculating apparatus 14a, based on the relative fluorescence intensity of the raw water, and the desired chlorine agent injection rate is calculated to FF control the chlorine agent injection amount. Thus, the chlorine agent amount to be used can be made minimum, and removal of ammonia nitrogen, removal of an iron and manganese, and disinfect treatment can be effectively made, and the reduction of trihalomethane formation potential can be achieved.

As stated above, according to the present invention, a water treatment system using a fluorescence analyzer measures online a relative fluorescence intensity of a water to be treated, controls an injection amount of an activated carbon, a chlorine agent, an ozone or a coagulant, or operates and controls a membrane filtration apparatus. Therefore, a reduction of trihalomethane formation potential, and a constraint of an excessive injection and an optimum operation control can be achieved.

What is claimed is:

1. A water treatment control system using a fluorescence analyzer comprising:

an injection mechanism for injecting an impregnating agent to a water to be treated;

a fluorescence analyzer for measuring a relative fluorescence intensity of the water to be treated;

a flowing water flowmeter for measuring a flow rate of the water to be treated; and a control apparatus for calculating an impregnating agent injection rate necessary to reduce a trihalomethane formation potential based on a measured value from the fluorescence analyzer to control the injection mechanism based on the impregnating agent injection rate and the flow rate from the flowing water flowmeter, wherein the injection mechanism includes an activated carbon injector for injecting an activated carbon to the water to be treated, and wherein the control apparatus includes an activated carbon injection rate calculating apparatus for calculating an activated carbon injection rate necessary to reduce the trihalomethane formation potential based on the measured value from the fluorescence analyzer, and an activated carbon injection amount control apparatus for controlling an activated carbon injection amount from the activated carbon injector based on the flow rate from the flowing water flowmeter and the activated carbon injection rate calculated by the activated carbon injection rate calculating apparatus.

2. The water treatment control system using a fluorescence analyzer according to claim 1, wherein the fluorescence analyzer consists of a pair of analyzers provided on both an upstream side and a downstream side of the activated carbon injector, and the activated carbon injection rate calculating apparatus calculates the activated carbon injection rate based on measured values from the pair of analyzers.

* * * * *